United States Patent [19]
Franklin

[11] Patent Number: 6,092,577
[45] Date of Patent: Jul. 25, 2000

[54] SIDE HOLDER OF AN ANTISKID CHAIN

[75] Inventor: Charles R. Franklin, Udine, Italy

[73] Assignee: Acciaierie Weissenfels S.p.A., Udine, Italy

[21] Appl. No.: 09/317,316

[22] Filed: May 24, 1999

[30] Foreign Application Priority Data

May 22, 1998 [DE] Germany ............................ 198 23 075

[51] Int. Cl.$^7$ ................................................. B60C 11/00
[52] U.S. Cl. ...................... 152/231; 152/177; 152/213 A; 152/219
[58] Field of Search ..................... 152/170, 171, 152/173, 175, 177, 208, 213 R, 213 A, 219, 231, 239, 240, 241, 242

[56] References Cited

U.S. PATENT DOCUMENTS

| | | | |
|---|---|---|---|
| 567,245 | 9/1896 | Lowrey | 152/170 |
| 2,673,586 | 3/1954 | Petrie | 152/219 |
| 4,378,040 | 3/1983 | Howell | 152/242 |
| 4,416,318 | 11/1983 | Rieger et al. | 152/242 |
| 4,615,368 | 10/1986 | Nestlen | 152/213 A |
| 4,825,923 | 5/1989 | Blankenship et al. | 152/219 |
| 4,832,100 | 5/1989 | Herdeg | 152/213 R |
| 5,082,039 | 1/1992 | Franklin | 152/241 |
| 5,236,025 | 8/1993 | Maresh | 152/219 |
| 5,309,968 | 5/1994 | Yoshida | 152/213 R |
| 5,318,087 | 6/1994 | Chang Gun | 152/219 |

*Primary Examiner*—S. Joseph Morano
*Assistant Examiner*—Long Bao Nguyen
*Attorney, Agent, or Firm*—McAulay Nissen Goldberg Kiel & Hand, LLP

[57] ABSTRACT

In an antiskid chain, a side holder has a closure for connecting the two free first and second ends of a shackle strand, each of which ends is provided with a thickened portion. The shackle strand can rest against the side of a vehicle tire and serves to fasten the running netting of the antiskid chain by means of fastening hooks. The closure is formed of a molded part which has a central, substantially plate-shaped portion, both of whose ends located opposite one another are bent toward the plate underside while forming an open, approximately cylindrical interior space. Tabs which are likewise bent downward from both longitudinal sides of the molded part are provided directly adjacent to the bend. Two tabs which are located opposite to one another are inclined approximately in a roof-shaped manner relative to one another in cross section. The molded part having a slit in the center in the longitudinal direction. The slit completely penetrates the thickness of the central plate-shaped portion of the molded part and enters into the bent ends of the molded part at most by an amount corresponding to the diameter of its cylindrical inner spaces. The slit has a width through which the shackle strand can be inserted and the slit in the central area of the length of the closure is provided with a lateral widening which permits the ends of the shackle strand provided with the thickened portions to be guided through.

11 Claims, 5 Drawing Sheets

SIDE HOLDER OF AN ANTISKID CHAIN

BACKGROUND OF THE INVENTION a) Field of the Invention

The invention is directed to a side holder of an antiskid chain with a closure for connecting the two free ends of a shackle strand.

b) Description of the Related Art

Side holders of this type are described in a number of texts and serve to hold a running netting placed over the tread of a tire on the tread, wherein the running netting is connected to the side holders contacting both sides or flanks of the tire with specially constructed fastening hooks.

In most known constructional forms of antiskid chains of this kind, the side holder provided on the outer flank of the tire is formed of a chain, whereas the side holder provided on the inner flank of the tire is formed of a shackle strand constructed as a one-piece, springing-elastic ring which has an opening and can be formed, in turn, from a wire or a rope-like strand.

Shackle strands of the type mentioned above make it easier to tighten the antiskid chain on the tire because they are already shaped according to the shape of the tire.

However, the shackle strand lying on the inner side of the tire must be closed after the antiskid chain is tightened on the tire, i.e., its two free ends must be joined to or connected with one another.

Many different connection forms have been proposed for this purpose, mostly hook closures and eyelet closures such as those known, for example, from DE 16 05 675 C3 and EP 0 274 981 A2.

DE 16 05 675 C3 describes a closure for the side holder of an antiskid chain with a hook which is nondetachably suspended in an end link of the side holder, is constructed as a flat web and has an insertion opening defined by its nose for the other end link of the side holder which is to be connected therewith in a nondetachable manner.

For this purpose, the hook is formed by a plate-shaped, flat stamped part having, at one end, a nose which extends diagonally in the direction of the other end of the hook and which has an insertion opening for the other end link of the side holder to be connected with it, wherein the eyelet is produced from a stamped part whose flat sides or legs in the closed position lie parallel to the side surfaces of the hook whose nose engages around the web of the eyelet, which web is not as high as the legs, wherein the clearance of the eyelet between the legs is only slightly greater than the thickness of the hook.

This known closure has a relatively large installation height, i.e., it projects over the flanks of the tire provided with the antiskid chain more than the side holder lying on the flank.

A similar closure is described in EP 0 274 981 A2 in which the side holder is constructed as a one-piece springing-elastic ring and one end of the side holder is constructed as a flat hook which extends parallel to the flank of the tire and projects into an eyelet which is provided at the other end of the side holder and which is arranged at 90° to the hook plane. In this case, also, the installation height of the eyelet above the tire flank is distinctly greater than the installation height of the side holder or of the springing-elastic ring forming the shackle strand.

Finally, in another known antiskid chain, the shackle strand is constructed as a steel rope and each of its free ends is provided with a thickened portion. The closure for connecting the two ends is constructed as a sleeve-shaped pipe segment whose inner diameter corresponds to the outer diameter of the thickened portions. In its middle area, this pipe segment has an opening in its wall which should be large enough to allow the thickened portion of an end of the shackle strand to be inserted through this opening into the interior of the pipe segment, wherein the wall of the pipe segment has a slit from this opening to one of its two ends, which slit corresponds approximately to the diameter of the shackle strand, so that the latter can also be brought into the interior of the pipe segment from the side together with the thickened portion. The open ends of the pipe segment are deformed toward the inside to such an extent that the two ends of the shackle strand can still be guided through but the thickened portions are held in the interior of the pipe segment, wherein the end located opposite to the end of the pipe segment provided with the slit has no slit, but rather encloses the other thick end securely and nondetachably.

However, the diameter of this known closure is so large compared to the shackle strand, and therefore compared to the side holder, that it occupies a greater height when lying on the flank of the tire than the side holder itself. This is because twice the thickness of the walls of the pipe segments is added to the diameter of the thickened portions of the ends of the side holder.

Finally, DE-GM 89 02 454 discloses closing members which form the closure of a side holder constructed as a spring steel shackle at the respective ends of the shackle strand which are constructed identically to one another in a mirror-inverted manner and are fastened to the respective opposite ends of the spring steel shackle. Each of the closing links is stamped out of sheet steel, for example, and has two rivet holes at its end which faces the respective end of the spring steel shackle, wherein a counter-piece which engages around the end of the spring steel shackle in a clamping fit is riveted to the rivet holes. Further, every closing member is provided roughly in its center with an approximately rectangular cutout and has, near its free end, a closing hook which is formed by bending a sheet metal tongue out of the sheet steel of the base plate of the respective closing member in a suitable manner. This steel tongue is directed opposite to the closing direction, that is, in the direction of the respective spring steel shackle, so that it forms a closing hook which acts opposite to the closing direction. The sheet metal tab or tongue forming the closing hook extends diagonally outward in the vicinity of the free end of the respective closing member from the surface of the latter, i.e., toward the side of the closing member which is not provided for contacting the side cheek of the tire, and toward the cutout. The tongue is bent parallel to the surface of the closing member and runs parallel to the clamping plane of the closing member in the direction of the cutout, wherein it narrows in diameter toward its free end. The portion between the end portion of the tab and the surface of the closing member is not substantially larger than its sheet metal thickness. Further, the width of the portion of the tongue projecting from the surface is only slightly less than the width of the cutout. The closing hooks of the two closing members spring forward toward the same side and, together with the two cutouts, lie flush on a line of the closing direction. The closing members in turn lie in the plane defined by the spring steel shackle and can hook onto one another regardless of whether the two closing members lie in the front or in the back. Due to the fact that these closing members come to rest against one another, have projecting closing hooks which project from the surface of the closing members, specifically to the extent that they can absorb the thickness of the oppositely located closing members, there results a large installation height of the closure above the flank of the tire provided with the antiskid chain.

Besides the known closures described above, the fastening hooks for the running netting which are produced from simple round wires and are provided at the side holder have an installation height such that they project relatively far into the open space above the flank of the tire.

As was stated above, all of the known side holders have in common that they project relatively far or high above the flank of a tire with their closures and fastening hooks, that is, they occupy a greater height than the side holder or shackle strand which also lies on the flank of the tire. This projecting distance over the tire flanks brought about by the large installation height of the closure parts is disadvantageous precisely with respect to passenger automobiles of modern construction because the manufacturers of such passenger cars provide less and less free space between the tires on the one side and the interior frame or wheel housing of the vehicle on the other side. In particular, the space available between the inner side of a tire and the vehicle itself is constantly decreasing, so that precisely the side holder of the antiskid chain arranged on the inside of the tire must be designed in a particularly space-saving manner with respect to its space requirement.

OBJECT AND SUMMARY OF THE INVENTION

Proceeding from the foregoing, it is the primary object of the invention to build a known side holder of an antiskid chain of the type mentioned above with a closure for connecting the two free first and second ends of a shackle strand, each of which ends is provided with a thickened portion, which shackle strand can rest against the side of a vehicle tire and serves to fasten the running netting of the antiskid chain by means of fastening hooks, in such a way that the lateral projection of this arrangement over the flank of the tire provided with the antiskid chain is particularly slight.

In a side holder of the type mentioned above, this object is met first in that the closure is formed of a molded part which has a central, substantially plate-shaped portion, both of whose ends located opposite one another are bent toward the underside of the plate while forming an open, approximately cylindrical interior space and tabs which are likewise bent downward from both longitudinal sides of the molded part are provided directly adjacent to the bend, wherein two tabs which are located opposite to one another are inclined approximately in a roof-shaped manner relative to one another in cross section, and wherein the molded part has a slit in the center in the longitudinal direction, which slit completely penetrates the thickness of the central plate-shaped portion of the molded part and enters into the bent ends of the molded part at most by an amount corresponding to the diameter of its cylindrical inner spaces, wherein the slit has a width through which the shackle strand can be inserted and the slit in the central area of the length of the closure is provided with a lateral widening or expansion which permits the ends of the shackle strand provided with the thickened portions to be guided through.

This special construction of the closure according to the invention which is completely novel with respect to the known prior art ensures that the object of the invention is met, that is, to form a closure part which needs no more room and no greater distance from the flank of the tire than the shackle strand itself with its thickened ends. Further, this closure part is also characterized in particular in that it can be stamped out of a suitable sheet metal in a single stamping process and can be deformed by simple means without having to provide additional holding means and other fastening means between the shackle strand and the closure. Above all, the closure which is constructed as a flat molded part directly contacts the flank of the tire by its smooth surface and no space is used up unnecessarily. The ends of the central, substantially plate-shaped portion which are bent toward the underside of the molded part form not only an advantageous receptacle of the shackle strand, but also the abutment of the thickened portions of the ends of the shackle strand, wherein the side tabs of the molded part which are likewise bent toward the underside press the thickened portions of the ends of the shackle strand from the underside of the molded part into the slit running through the middle of the molded part in the longitudinal direction.

This closure, according to the invention, for the free ends of the shackle strand ensures in the simplest manner that the ends of the shackle strand can be inserted with their thickened portions one after the other into the slit running along the center of the molded part in the longitudinal direction, wherein the thickened portions of the ends of the shackle strand must, of course, be guided through the widening provided in the central area of the length of the closure. A further advantage of this closure construction also consists in that the free and detachable end with the thickened portion which is provided for opening and closing the shackle strand cannot exit from the widening and therefore from the slit when unintentionally pushed forward from the outside because the closure contacts the flank of the tire with its smooth surface and accordingly closes off the slit and its widening.

In an advantageous further development of the side holder, the thickened portions of the ends of the shackle strand are constructed so as to be round, hexagonal or octagonal in cross section. Compared with the simpler, round construction of the thickened portions of the ends, the polygonal constructions ensure that the ends of the shackle strand cannot turn inside the closure part because they contact the tabs on one side and the slit on the other side. Moreover, the alignment of the closure relative to the shackle strand and accordingly the position of the closure relative to the tire flank can be fixed i.e., the closure position relative to the tire cannot be changed unintentionally.

According to the invention, the overall installation height of the closure approximately corresponds to the diameter of the thickened portions of the ends of the shackle strand. Owing to this step, the object aimed for by the invention, namely, to realize the smallest possible distance of the closure from the flank of the tire, is achieved in particular so that the space required between the tire surface and the structural component parts of the vehicle is small.

Finally, the edges of the ends of the downwardly bent tabs, which edges project down the farthest, are constructed parallel to the surface of the underside of the molded piece and are aligned with the undersides of the two ends of the molded part which are bent toward the underside of the plate. This step also guarantees that the tabs do not exceed the aimed for small projecting distance of the closure over the tire flank.

In another advantageous construction of the invention, the two oppositely located tabs of the one end of the molded part rest against one of the thickened ends of the shackle strand with pressure at the thickened end and securely hold the latter in the closure in a nondetachable manner.

This step ensures that the closure will not be unintentionally detached from one of the two ends of the shackle strand and cannot be lost in particular when tightening and mounting the chain. On the other hand, the other thickened end of the shackle strand is not fastened in the closure in a nondetachable manner; it serves for locking and unlocking the end of the shackle strand with the closure and it remains in the closed position until the antiskid chain is tightened and fixedly clamped on the tire.

The edges of the slit are advantageously constructed so as to be inclined downward at an increasing distance from one another and are adapted to the outer surface of the thickened portions of the ends of the shackle strand, which outer surface comes into contact with them. As a result of this construction of the slit which narrows from the underside to the upper side of the molded piece, the thickened portions can project relatively far into the slit especially when the inclinations of the edges are adapted to the respective shape of the thickened portions which may be round, hexagonal or octagonal. Moreover, corresponding results are brought about in that the tabs which are bent downward and which are located opposite from one another likewise correspondingly contact the thickened portions of the ends of the shackle strand by their surfaces that are inclined in a roof-shaped manner.

However, since the side holder not only has the closure suggested for closing the two free ends of the shackle strand, but also has fastening hooks for the running netting, the object of the invention described above also extends to the special construction of these fastening hooks.

According to the invention, these fastening hooks for the running netting are produced from a wire which is oval in cross section, and the wire forms the fastening hooks in such a way that it contacts, with its oval sides, the shackle strand on the one hand and the flank of the tire on the other hand. Because of this construction according to the invention, a fastening hook of this kind projects a shorter distance over the flank of the tire than the previously known fastening hooks which are produced from wire with a round cross section.

In comparison with the side holders according to the prior art, all of the features of the side holder of a antiskid chain, according to the invention, which were described above ensure that the antiskid chains which are provided with these side holders project substantially less over the flanks of the tires provided with such antiskid chains, and antiskid chains of this kind can therefore also be used without problems in the most modern vehicles.

The side holder of an antiskid chain suggested in accordance with the invention will be described more fully hereinafter by way of example with reference to the drawings.

DESCRIPTION OF THE PREFERRED EMBODIMENTS

Figure 1:
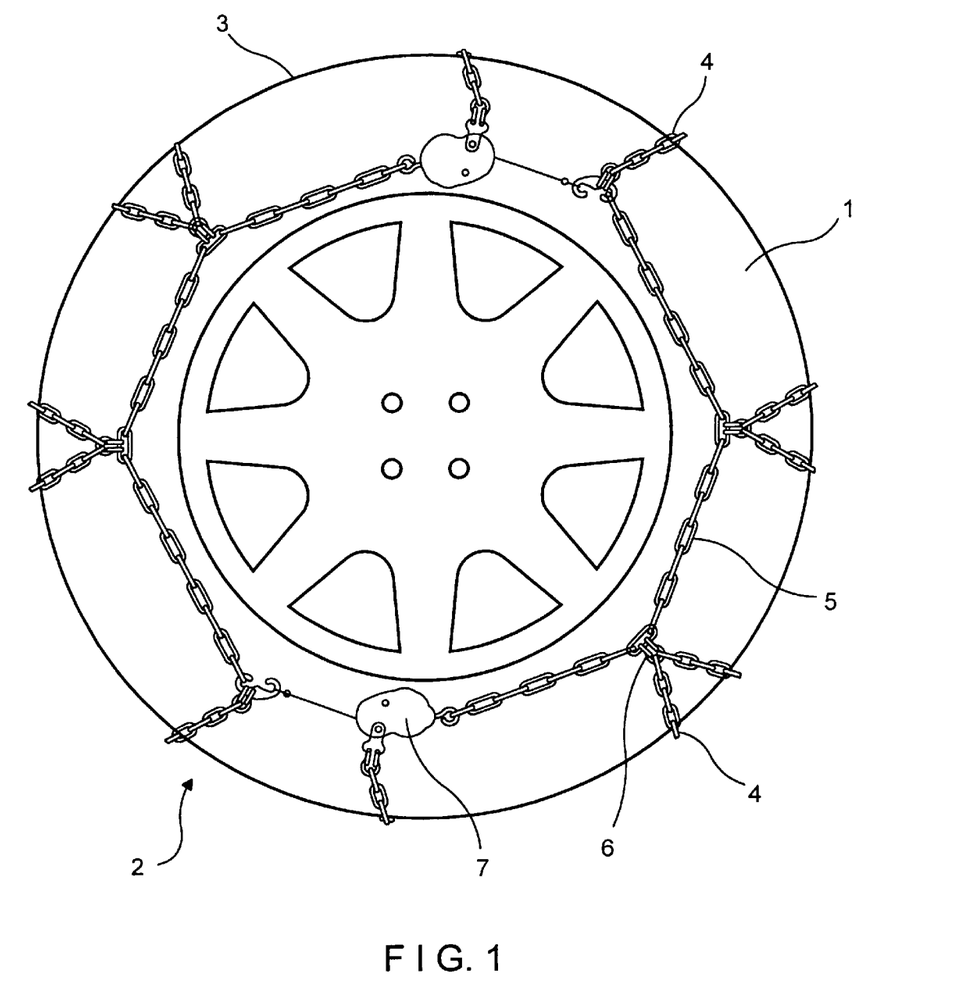
FIG. 1 shows the front side of a tire around which an antiskid chain is clamped and, in particular, the side holder with clamping and closure parts which is constructed as a chain.
Figure 2:
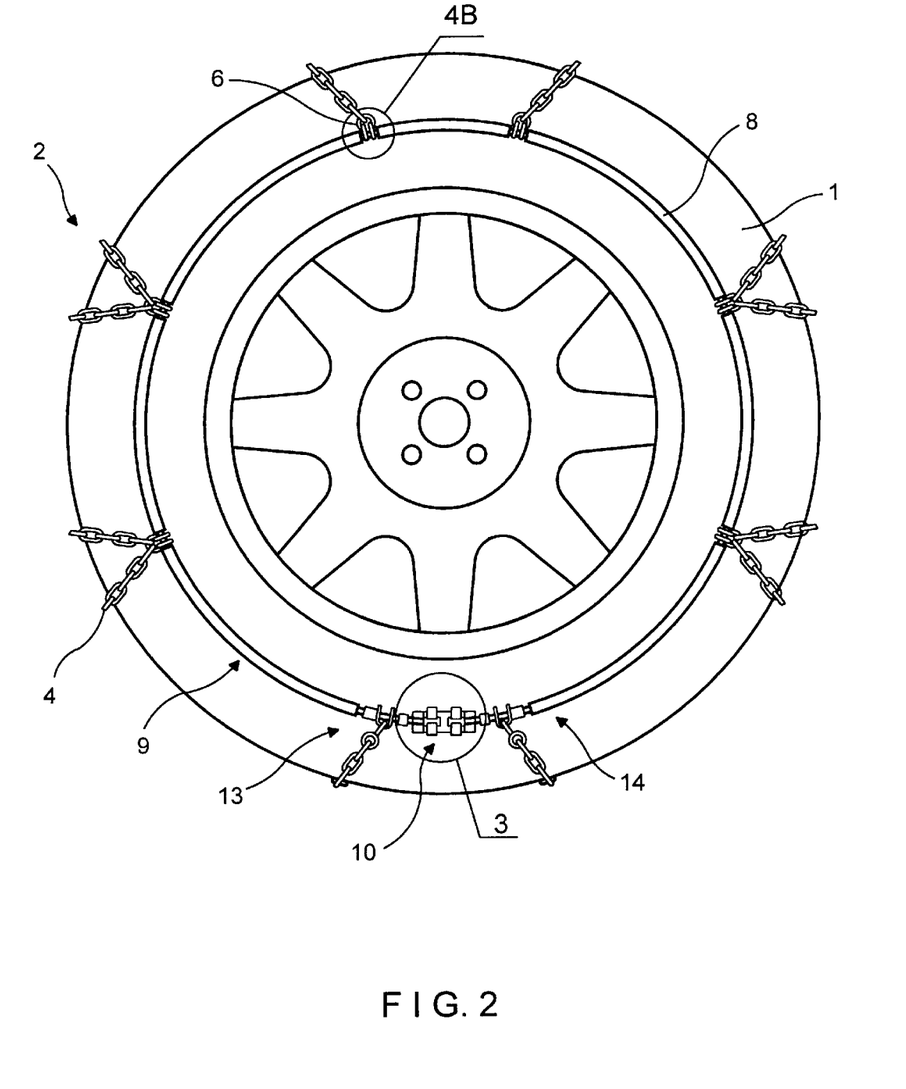
FIG. 2 shows the inner side of the tire around which an antiskid chain is clamped and, in particular, the side holder with closure and fastening hooks which is constructed as a dimensionally stable shackle strand.
Figure 3:
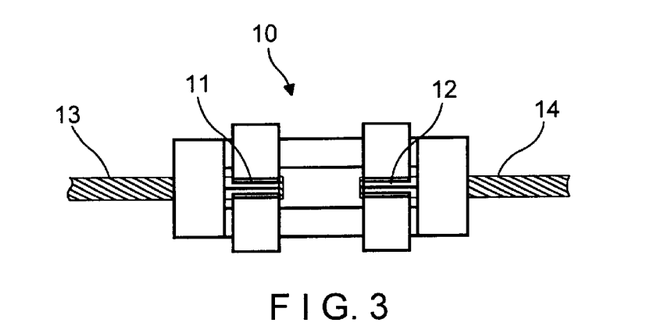
FIG. 3 shows an enlarged view of the closure which receives and holds the two free ends of the shackle strand.

The antiskid chain 2, shown in FIGS. 1 and 2, which is tightened on a tire 1 is substantially formed of a running netting 4 which lies on the tire tread 3, a first side holder 5 lying on the outer flank of the tire 1, with reference to FIG. 1, and constructed as a chain, wherein the running netting 4 is fastened to the first side holder 5 by fastening hooks 6 and wherein the side holder 5 has closure and clamping parts 7, a second side holder 9 which is constructed as a dimensionally stable shackle strand 8 and which lies on the inner flank of the tire 1 shown in FIG. 2, the running netting 4 being fastened to the second side holder 9 by means of fastening hooks 6, and wherein the shackle strand 8 has a closure 10 which, as is shown in enlarged scale in FIG. 3, receives and holds the two free first and second ends 13 and 14 of the shackle strand 8 which are provided with a thickened portion 11 and 12, respectively.

Figure 5A:
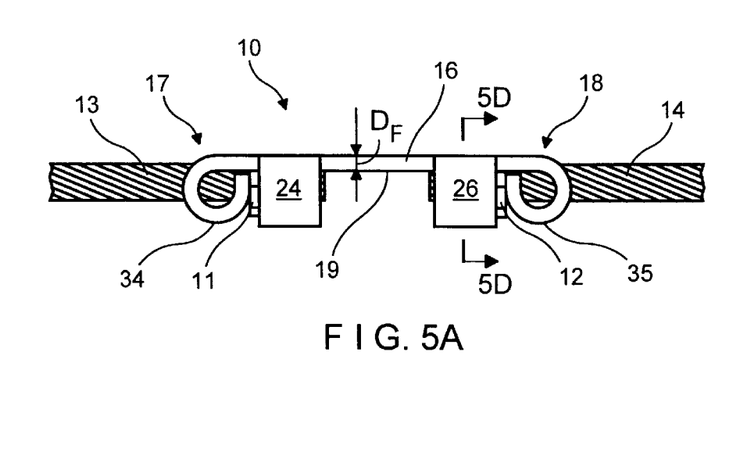
FIG. 5A shows a front view of the closure.
Figure 5B:
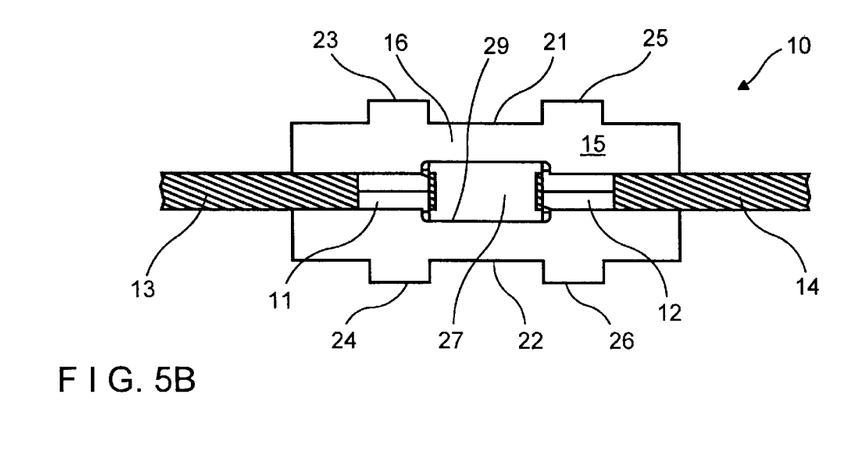
FIG. 5B shows a top view of the upper side of the closure.
Figure 5C:
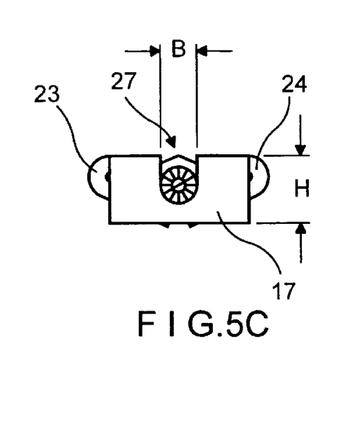
FIG. 5C shows a side view of the closure.
Figure 5D:
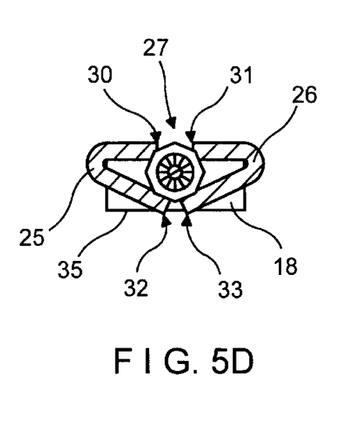
FIG. 5D shows a section according to line V—V in FIG. 5A.

The closure 10 is formed of a molded part 15 which is stamped from a flat sheet metal of determined and required thickness and which has a central, substantially plate-shaped portion 16, both of whose ends 17 and 18 which are located opposite one another are bent toward the underside 19 of the plate while forming an open, approximately cylindrical inner space 20. Tabs 23, 25 and 24, 26, respectively, which are likewise bent downward from both longitudinal sides 21 and 22 of the molded part 15 are provided directly adjacent to these bends, wherein two tabs 23, 24 and 25, 26, respectively, which are located opposite one another are inclined toward one another in an approximately roof-shaped manner in cross section as is shown in FIG. 5D.

The molded part 15 has a slit 27 in the center in the longitudinal direction, which slit 27 completely penetrates the thickness $D_F$ of the center plate-shaped portion 16 of the molded part 15 and enters farther into the bent ends 17 and 18 of the molded part 15 by a maximum amount corresponding to the diameter $D_I$ of its cylindrical inner spaces 20, wherein the slit 27 has a width B through which the shackle strand 8 can be inserted, and the slit 27 is provided with a lateral widening 29 in the middle area 28 of the length of the closure 10, which lateral widening 29 allows the ends 13 and 14 of the shackle strand 8 which are provided with the thickened portions 11 and 12 to be guided through.

These thickened portions 11 and 12 of the ends 13 and 14 of the shackle strand 8 can be round or polygonal. In the embodiment example, especially as shown in FIG. 5D, an octagonal construction is shown. This ensures that these thickened portions 11 and 12 cannot rotate in the closure 10, specifically because some of these surfaces or corners of the thickened portions 11 and 12 contact the edges 30 and 31 of the slit 27 or the tabs 23 and 24 or 25 and 26 which are bent downward and inclined relative to one another in a roof-shaped manner.

The edges 30 and 31 of the slit 27 are inclined in an advantageous construction, especially in such a way that the slit 27 expands in width toward the underside 19.

The downwardly projecting edges 32 and 33 of the tabs 23 and 24 or 25 and 26 are constructed in a flattened manner, namely so as to run parallel to the underside 19 of the molded part 15 and flush with the undersides 34 and 35 of the two ends 17 and 18 of the molded part 15 which are bent down toward the underside of the plate.

This special fashioning of the closure 10 ensures that its overall installation height H exceeds the diameter of the thickened portions 11 and 12 of the ends 13 and 14 of the shackle strand 8 only slightly and therefore ensures that the lateral overlap over the tire flank formed by the closure and side holder can be kept small.

Figure 4A:
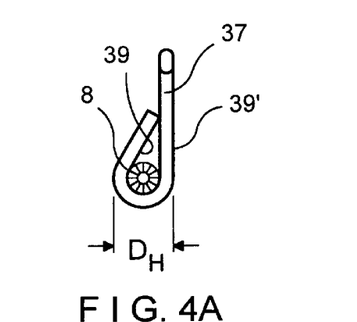
FIG. 4A shows a side view of a fastening hook which is arranged at the shackle strand.
Figure 4B:
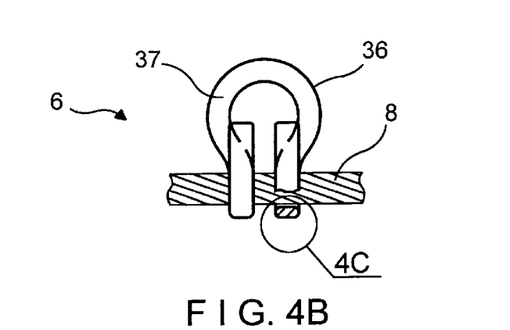
FIG. 4B shows a view of a fastening hook which is arranged at the shackle strand.
Figure 4C:
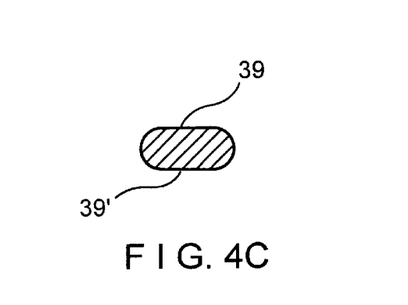
FIG. 4C shows a cross section of the wire forming the fastening hook.

FIGS. 4A to 4C show the fastening hooks 6 which hold the running netting 2 at the side holders 5 and 9 and which are constructed as a double-hook 36 and are formed from a wire 37 having an oval cross section 38 with two sides 39 and 39' extending substantially parallel to one another, as is shown particularly in FIG. 4C.

The double-hook 36 is formed from the oval wire 37 in such a way that one of its oval sides 39 contacts the outer surface of the shackle strand 8 and its other oval side 39' contacts the flank of the tire 1, so that, as is shown especially in FIG. 4A, the contact height $D_H$ is appreciably reduced compared with a construction from round wire while, at the same time, retaining the desired cross section.

Figure 6A:
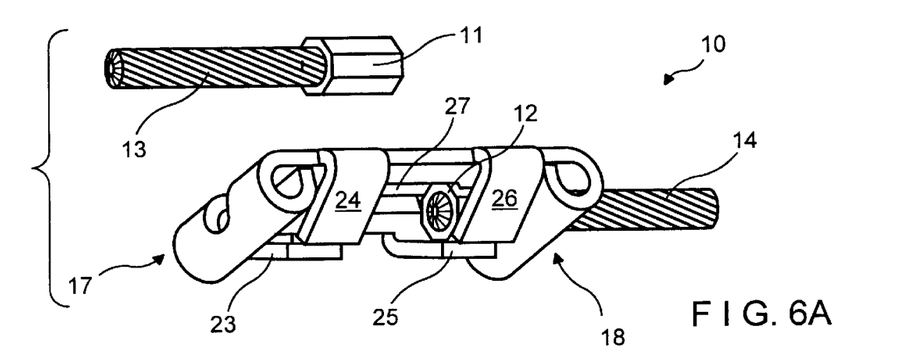
FIG. 6A shows a perspective view of the closure on its underside, wherein the free end of the shackle strand is not yet inserted.
Figure 6B:
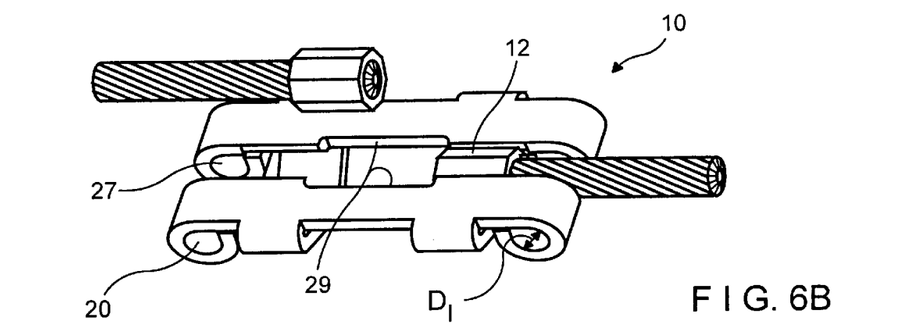
FIG. 6B shows a perspective view of the upper side of the closure, wherein the free end of the shackle strand is not yet inserted.
Figure 6C:
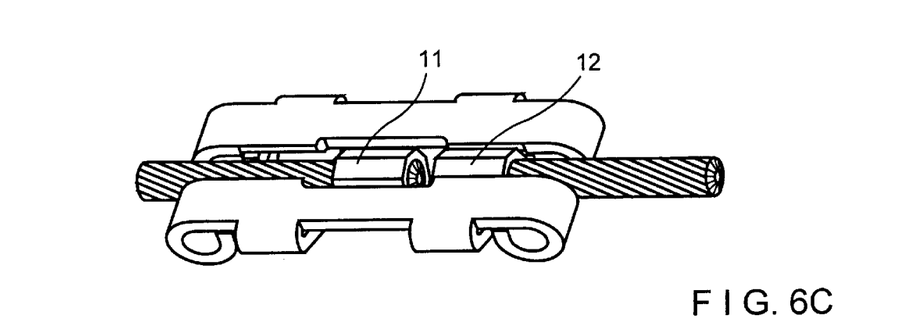
FIG. 6C shows a perspective view of the upper side of the closure, wherein the free end of the shackle strand is inserted but not yet locked.
Figure 6D:
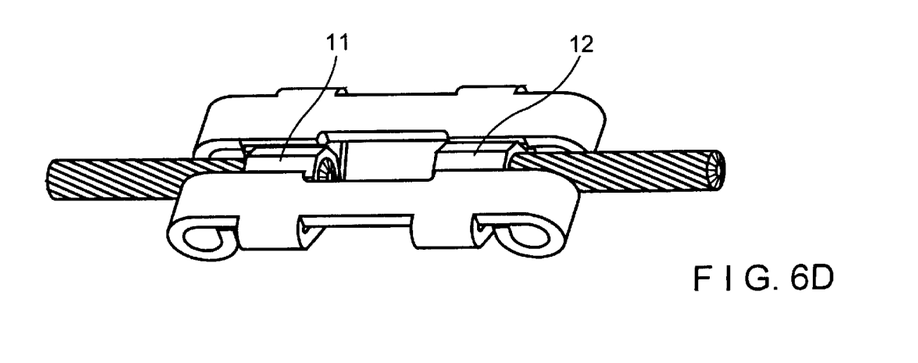
FIG. 6D shows a perspective view of the upper side of the closure, wherein the free end of the shackle strand is inserted and locked.

FIGS. 6A and 6D show the closing process of the ends 13 and 14 of the shackle strand 8 which are provided with the thickened portions 11 and 12.

The first end 14 with the thickened portion 12 of the shackle strand 8 is fastened in the closure 10 so as to be nondetachable, so that it cannot fall out of the closure 10 when the antiskid chain is not clamped and especially during the tightening and mounting of the antiskid chain. For this purpose, the tabs 25 and 26 are pressed firmly against the multiple-surface thickened portion 12 of the end 14 and clamp them between the edges 30 and 31 of the slit 27.

FIG. 6A shows how the detachable second end 13 with the thickened portion 11 is brought over the closure 10 and into the area of the slit 27 and, especially, how the thickened portion 11 is moved into the area with the widened portions 29 and guided to the closure 10 and, as is shown in FIG. 6C, inserted therein. In contrast to FIG. 6A, FIGS. 6B and 6C show this process in a perspective view on the upper side of the closure.

As is shown in the final position in FIG. 6D, the end 13 of the shackle strand 8 is drawn into the space formed by the tabs 23 and 24 and then held therein so as to be fixed against rotation in the area formed together with the edges 30 and 31 of the slit 27.

The antiskid chain 2 can then be securely locked to the tire 1 on the front side of the tire 1 with the closing and clamping devices 7 shown in FIG. 1.

While the foregoing description and drawings represent the preferred embodiments of the present invention, it will be obvious to those skilled in the art that various changes and modifications may be made therein without departing from the true spirit and scope of the present invention.

What is claimed is:

1. A side holder of an antiskid chain comprising:

a closure for connecting two free first and second ends of a shackle strand, each of which ends being provided with a thickened portion;

said shackle strand adapted to rest against the side of a vehicle tire and serving to fasten running netting of the antiskid chain by fastening hooks;

said closure being formed of a molded part having a central, substantially plate-shaped portion;

said plate-shaped portion having a pair of ends located opposite one another which are bent toward an underside of the plate portion while forming an open, approximately cylindrical interior space;

tabs from two longitudinal sides of the molded part which are provided directly adjacent to the bend are likewise bent downward;

two of said tabs which are located opposite to one another being inclined approximately in a roof-shaped manner relative to one another in cross section;

said molded part having a slit in a center at the longitudinal direction, said slit completely penetrating the thickness of the central plate-shaped portion of the molded part and entering into bent ends of the molded part at most by an amount corresponding to the diameter of cylindrical inner spaces;

said slit having a width through which the shackle strand can be inserted and the slit in the central area of the length of the closure being provided with a lateral widening which permits the ends of the shackle strand provided with said thickened portions to be guided through.

2. The side holder according to claim 1, wherein the thickened portions of the ends of the shackle strand (8) are constructed so as to be hexagonal in cross section.

3. The side holder according to claim 1, wherein the thickened portions of the ends of the shackle strand are constructed so as to be octagonal in cross section.

4. The side holder according to claim 1, wherein the thickened portions of the ends and of the shackle strand are constructed so as to be round in cross section.

5. The side holder according to claim 1, wherein the overall installation height of the closure approximately corresponds to the diameter of the thickened portions of the ends of the shackle strand.

6. The side holder according to claim 5, wherein the edges and the free ends of the downwardly bent tabs which edges project down the farthest are constructed parallel to the surface of the underside of the molded part and are aligned with the undersides of the two ends of the molded part which are bent toward the underside of the plate.

7. The side holder according to claim 1, wherein the two oppositely located tabs of the one end of the molded part rest against the thickened portion of the first inserted end of the shackle strand with pressure at the thickened end and hold the latter in the closure in a nondetachable manner.

8. The side holder according to claim 1, wherein the edges of the slit are constructed so as to be inclined downward at an increasing distance from one another and are adapted to the outer surface of the thickened portions of the ends of the shackle strand, which outer surface comes into contact with them.

9. The side holder of an antiskid chain according to claim 1, wherein the fastening hooks for the running netting are produced from a wire which is oval in cross section and forms the fastening hooks in such a way that it contacts with the oval sides, the shackle strand, and a flank of the tire.

10. The side holder according to claim 9, wherein the thickness of the wire forming the fastening hook is half as large between the oval sides as the diameter of the wire or rope forming the shackle strand.

11. The side holder according to claim 9, wherein the fastening hooks are constructed as double-hooks.

* * * * *